No. 762,347. PATENTED JUNE 14, 1904.
J. PLUCK.
DEVICE FOR SCRAPING PLOWS.
APPLICATION FILED MAY 25, 1903.
NO MODEL.

Witnesses: Inventor:
W. J. Harper James Pluck
August Kempf

No. 762,347.

Patented June 14, 1904.

UNITED STATES PATENT OFFICE.

JAMES PLUCK, OF HONDO, TEXAS.

DEVICE FOR SCRAPING PLOWS.

SPECIFICATION forming part of Letters Patent No. 762,347, dated June 14, 1904.

Application filed May 25, 1903. Serial No. 158,721. (No model.)

*To all whom it may concern:*

Be it known that I, JAMES PLUCK, a citizen of the United States, residing at Hondo, in the county of Medina and State of Texas, have invented a new and useful Device for Scraping Plows When Being Used for Plowing, of which the following is a specification.

My invention relates to plow-scrapers, and has for its object a simple and convenient device for removing accumulations of soil from the moldboard of a plow.

A further object is to provide a scraper which may be adjusted to various positions on the plow and also to fit plows of different makes or construction.

With these and other objects in view the invention consists in certain novel features hereinafter described and claimed, and shown in the accompanying drawings, in which—

Figure 1:
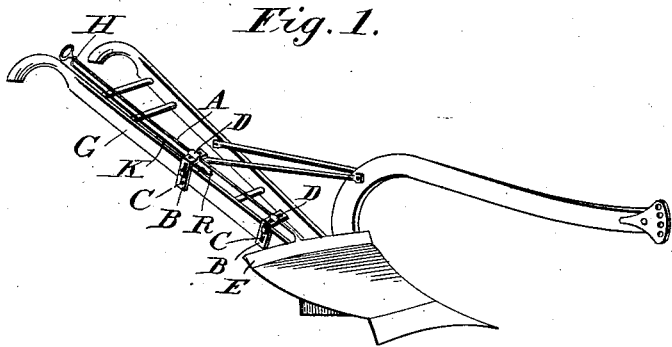
Figure 2:
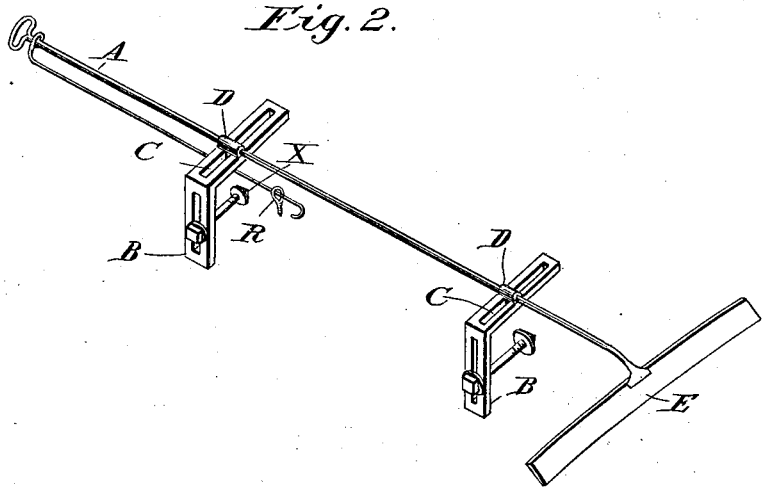

Figure 1 is a perspective view of a plow provided with my improved scraper. Fig. 2 is a perspective view of the scraper and its attaching means removed from the plow.

Referring specifically to the drawings, A indicates a spring-metal rod, which constitutes the shank of a scraper-blade E, which is secured at the lower end thereof. The upper end of the shank is looped to form a handle to be grasped by the operator to actuate the scraper. The shank by reason of its spring causes the blade to bear firmly and evenly on the surface of the moldboard.

At B are indicated angle-irons for supporting the shank. Both arms of the irons are slotted, as at C, and they are secured to the side of the plow-handle G by bolts X, which pass through one of the slotted arms and through the handle. This slotted construction permits vertical adjustment of the angle-irons.

At D is indicated eyebolts through which the shank A extends. The eyebolts extend through the slot in the horizontal arm of the angle-irons and may be laterally adjusted after loosening their nuts.

At K is indicated a rod, one end of which is twisted around and then welded or otherwise secured to the shank A near its upper end, forming a stop H thereon. The lower end of this rod is bent to form a hook, and passes through a screw-eye R, screwed into the plow-handle. When the scraper-shank is pushed downwardly too far, the stop H will strike the eyebolt D, and if raised too far the hooked end of the rod K will engage the screw-eye R. This prevents the scraper-blade from being pushed off the plow-point or going over the top of the moldboard.

Having thus described my invention, what is claimed as new, and desired to be secured by Letters Patent, is—

1. The combination with a plow, of slotted angle-irons secured to the plow-handle, eyebolts in the slots, a shank extending through the eyebolts, and a scraper-blade on the shank to engage the moldboard.

2. The combination with a plow, of slotted angle-irons secured to the plow-handle, eyebolts in the slots, a shank extending through the eyebolts, a scraper-blade on the shank to engage the moldboard, and a stop to limit the movement of the scraper in either direction.

3. The combination with a plow, of vertically-adjustable angle-irons secured to the plow-handle, eyebolts secured to the angle-irons and laterally adjustable thereon, a shank extending through the eyebolts, and a scraper-blade on the end of the shank to engage the moldboard.

4. The combination with a plow, of slotted angle-irons secured to the plow-handle, eyebolts adjustably secured in the slots, a shank extending through the eyebolts and a scraper-blade on the end of the shank to engage the moldboard.

5. The combination with a plow, of slotted angle-irons secured to the plow-handle, eyebolts adjustably secured in the slots, a shank extending through the eyebolts and having at one end a scraper-blade to engage the moldboard, and at the other end a stop to engage one of the eyebolts, a screw-eye in the handle, a rod secured to the shank extending through the screw-eye, and having a hooked end to engage the same.

JAMES PLUCK.

Witnesses:
AUGUST KEMPF,
W. J. HARPER.